United States Patent
Arrabolu et al.

(10) Patent No.: US 11,196,613 B2
(45) Date of Patent: Dec. 7, 2021

(54) TECHNIQUES FOR CORRELATING SERVICE EVENTS IN COMPUTER NETWORK DIAGNOSTICS

(71) Applicant: Microsoft Technology Licensing, LLC, Redmond, WA (US)

(72) Inventors: Sai Sankalp Arrabolu, Kirkland, WA (US); Alia Maisel Buckner, Seattle, WA (US); Thomas William Potthast, III, Sammamish, WA (US); Russell Joseph Trupiano, Redmond, WA (US); Anastasiia Pronska, Kirkland, WA (US); Roman Batoukov, Sammamish, WA (US); John Anthony Morman, Bellevue, WA (US); Keiji Kanazawa, Seattle, WA (US); Navendu Jain, Snohomish, WA (US); Irina Frumkin, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 16/567,931

(22) Filed: Sep. 11, 2019

(65) Prior Publication Data
US 2020/0374179 A1 Nov. 26, 2020

Related U.S. Application Data

(60) Provisional application No. 62/850,253, filed on May 20, 2019.

(51) Int. Cl.
*H04L 12/24* (2006.01)
*H04L 12/26* (2006.01)

(52) U.S. Cl.
CPC ...... *H04L 41/0631* (2013.01); *H04L 41/0609* (2013.01); *H04L 41/069* (2013.01); *H04L 41/50* (2013.01); *H04L 43/0817* (2013.01)

(58) Field of Classification Search
CPC ............. H04L 41/0631; H04L 41/0609; H04L 41/069; H04L 41/50; H04L 43/0817
(Continued)

(56) References Cited

U.S. PATENT DOCUMENTS 7,386,417 B1 6/2008 Bao et al.
7,552,447 B2 6/2009 Uthe
(Continued)

FOREIGN PATENT DOCUMENTS

WO 2015023286 A1 2/2015

OTHER PUBLICATIONS

"Alert Group Types", Retrieved From https://docs.servicenow.com/bundle/london-it-operations-management/page/product/event-management/concept/Alert-Groups.html, Retrieved on Apr. 25, 2019, 3 Pages.
(Continued)

*Primary Examiner* — Tan Doan
(74) *Attorney, Agent, or Firm* — Arent Fox LLP

(57) ABSTRACT

Examples described herein generally relate to identifying a set of service events corresponding to an incident report, querying a multiple-layer relational graph to determine one or more other service events related to the set of service events, detecting a pattern in the set of service events and a subset of the one or more other service events, and indicating, via a user interface and based on the incident report, the subset of the one or more other service events as related to the incident report.

20 Claims, 8 Drawing Sheets

(58) Field of Classification Search
USPC .......................................................... 709/224
See application file for complete search history.

(56) References Cited

U.S. PATENT DOCUMENTS

| | | | |
|---|---|---|---|
| 8,417,553 | B2 | 4/2013 | Putra et al. |
| 9,590,880 | B2 | 3/2017 | Ashby et al. |
| 9,736,025 | B2 | 8/2017 | Weavind et al. |
| 10,270,668 | B1 | 4/2019 | Thompson et al. |
| 2010/0131315 | A1 | 5/2010 | Gilbert et al. |
| 2010/0223628 | A1 | 9/2010 | Rosenbluth et al. |
| 2011/0231704 | A1 | 9/2011 | Ge et al. |
| 2011/0295898 | A1 | 12/2011 | Grabarnik et al. |
| 2012/0041575 | A1 | 2/2012 | Maeda et al. |
| 2013/0262586 | A1* | 10/2013 | Chan .................. G06Q 50/01 709/204 |
| 2013/0282895 | A1 | 10/2013 | Ko et al. |
| 2014/0358609 | A1 | 12/2014 | De Assuncao et al. |
| 2015/0033084 | A1 | 1/2015 | Sasturkar et al. |
| 2015/0058802 | A1* | 2/2015 | Turaj .................. H04L 41/12 715/810 |
| 2015/0356301 | A1 | 12/2015 | Diehl et al. |
| 2017/0063896 | A1* | 3/2017 | Muddu ............... H04L 41/0893 |
| 2017/0075749 | A1 | 3/2017 | Ambichl et al. |
| 2017/0279687 | A1 | 9/2017 | MuntÉs-Mulero et al. |
| 2018/0091413 | A1 | 3/2018 | Richards et al. |
| 2018/0307756 | A1 | 10/2018 | Garay |
| 2019/0058626 | A1 | 2/2019 | Knowles et al. |
| 2020/0106660 | A1* | 4/2020 | Kakani ............... G06F 11/0709 |
| 2020/0159380 | A1* | 5/2020 | Wadikar ............... G06F 3/0485 |
| 2020/0374199 | A1 | 11/2020 | Arrabolu et al. |

OTHER PUBLICATIONS

"Event Management | Grouping Alerts", Retrieved From https://www.youtube.com/watch?v=xjmKDkUjhml, Mar. 19, 2018, 4 Pages.

Luo, et al., "Correlating Events with Time Series for Incident Diagnosis", In Proceedings of The 20th ACM SIGKDD International Conference on Knowledge Discovery and Data Mining, Aug. 24, 2014, pp. 1583-1592.

Lin, Jieyu, "MonArch: Scalable Monitoring and Analytics for Visibility and Insights in Virtualized Heterogeneous Cloud Infrastructure", In thesis submitted in conformity with the requirements for the degree of Master of Applied Science, University of Toronto, Jan. 31, 2015, 99 Pages.

"International Search Report and Written Opinion Issued in PCT Application No. PCT/US20/028555", dated Sep. 2, 2020, 13 Pages.

"International Search Report and Written Opinion Issued in PCT Application No. PCT/US20/028558", dated Aug. 11, 2020, 13 Pages.

"Final Office Action Issued in U.S. Appl. No. 16/567,824", dated Feb. 17, 2021, 9 Pages.

"Non-Final Office Action Issued in U.S. Appl. No. 16/567,824", dated Nov. 20, 2020, 8 Pages.

* cited by examiner

TECHNIQUES FOR CORRELATING SERVICE EVENTS IN COMPUTER NETWORK DIAGNOSTICS

CLAIM OF PRIORITY UNDER 35 U.S.C. § 119

The present Application for Patent claims priority to Provisional Application No. 62/850,253, entitled "TECHNIQUES FOR CORRELATING SERVICE EVENTS IN COMPUTER NETWORK DIAGNOSTICS" filed May 20, 2019, which is assigned to the assignee hereof and hereby expressly incorporated by reference herein for all purposes.

BACKGROUND

Large-scale networked systems are provided as platforms employed in a variety of settings for running service applications and maintaining data for business and operational functions. Such networks can include and/or be a part of a data center (e.g., a physical cloud computing infrastructure) that may provide a variety of services (e.g., web applications, email services, search engine services, resource sharing services, etc.) for client computing devices connected to at least a portion of the network. These large-scale networked systems typically include a large number of resources distributed throughout the data center, where each resource can include or at least resemble a physical machine.

In the realm of telemetry for monitoring health of network resources, a vast number (e.g., billions) of metrics are collected from or for resources over a period of time (e.g., each second) of a given network. Due to the number of metrics, it can become difficult to keep track of the metrics and/or related signals, health status of the network resources, etc. In addition, when services experience issues, engineers that maintain the services and/or corresponding resources may be notified by system alarms tens or hundreds of times, and the engineers do not always know which alarm is the most important to respond to, or may miss important alarms due to the sheer number of alarms. Issues can also be caused by downstream dependencies, and without the necessary domain knowledge, it can be difficult to understand what signals are affecting a given service, and/or how to locate/determine a dependency that may ultimately be causing the issue.

A single service outage or quality issue may result in the creation of tens or hundreds of incident records, and notification of creation of these records, across many different engineering teams. In the "fog of war", the goal of on-call engineers is to (1) determine if there is actually an issue, (2) find the cause of the issue, and (3) mitigate the issue if there is actually an issue. During or after an incident episode, on-call engineers may also be responsible for collating and linking the many incident records to have an accurate post-incident record of the service event.

SUMMARY

The following presents a simplified summary of one or more examples in order to provide a basic understanding of such examples. This summary is not an extensive overview of all contemplated examples, and is intended to neither identify key or critical elements of all examples nor delineate the scope of any or all examples. Its sole purpose is to present some concepts of one or more examples in a simplified form as a prelude to the more detailed description that is presented later.

In an example, a computer-implemented method for detecting related service events in a network diagnostic application is provided. The method includes identifying a set of service events corresponding to an incident report, querying a multiple-layer relational graph to determine one or more other service events related to the set of service events, detecting a pattern in the set of service events and a subset of the one or more other service events, and indicating, via a user interface and based on the incident report, the subset of the one or more other service events as related to the incident report.

In another example, a computing device for detecting related service events in a network diagnostic application is provided that includes a memory storing one or more parameters or instructions for identifying related service events from a service event repository, and at least one processor coupled to the memory. The at least one processor is configured to identify a set of service events corresponding to an incident report, query a multiple-layer relational graph to determine one or more other service events related to the set of service events, detect a pattern in the set of service events and a subset of the one or more other service events, and indicate, via a user interface and based on the incident report, the subset of the one or more other service events as related to the incident report.

In another example, a non-transitory computer-readable medium including code executable by one or more processors for detecting related service events in a network diagnostic application is provided. The code includes code for identifying a set of service events corresponding to an incident report, querying a multiple-layer relational graph to determine one or more other service events related to the set of service events, detecting a pattern in the set of service events and a subset of the one or more other service events, and indicating, via a user interface and based on the incident report, the subset of the one or more other service events as related to the incident report.

To the accomplishment of the foregoing and related ends, the one or more examples comprise the features hereinafter fully described and particularly pointed out in the claims. The following description and the annexed drawings set forth in detail certain illustrative features of the one or more examples. These features are indicative, however, of but a few of the various ways in which the principles of various examples may be employed, and this description is intended to include all such examples and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Described herein are various examples related to identifying, for an incident report, other incident reports and/or underlying service events that may be related to the incident report. This can facilitate improved incident report analysis to determine a root cause (or one or more other possible causes) of the incident, which can expedite tracking down the issue, prevent users from working to resolve the same underlying issue causing related incidents, and/or the like. For instance, a multiple-layer relational graph can be generated and employed to define relationships among service events, and the graph can be queried to determine, for a given service or service event, the correlations and/or corresponding patterns at one or more of the layers to determine a set of related services or service events.

For an identified incident report, for example, a set of underlying service events can be determined, and the multiple-layer relational graph can be queried to determine other service events and/or other services related to the set of underlying service events. In addition, pattern detection, correlation, or other machine-learning processes can be performed with respect to the other service events and the set of underlying service events to determine a subset of service events that are possibly related to the set of underlying service events. In any case, additional identified service events can be reported for the incident report to notify of the additional service events and/or corresponding incidents on other services, which can allow a user to determine whether other events/incidents are actually causing the incident that is the subject of the originally identified incident report.

Figure 1:
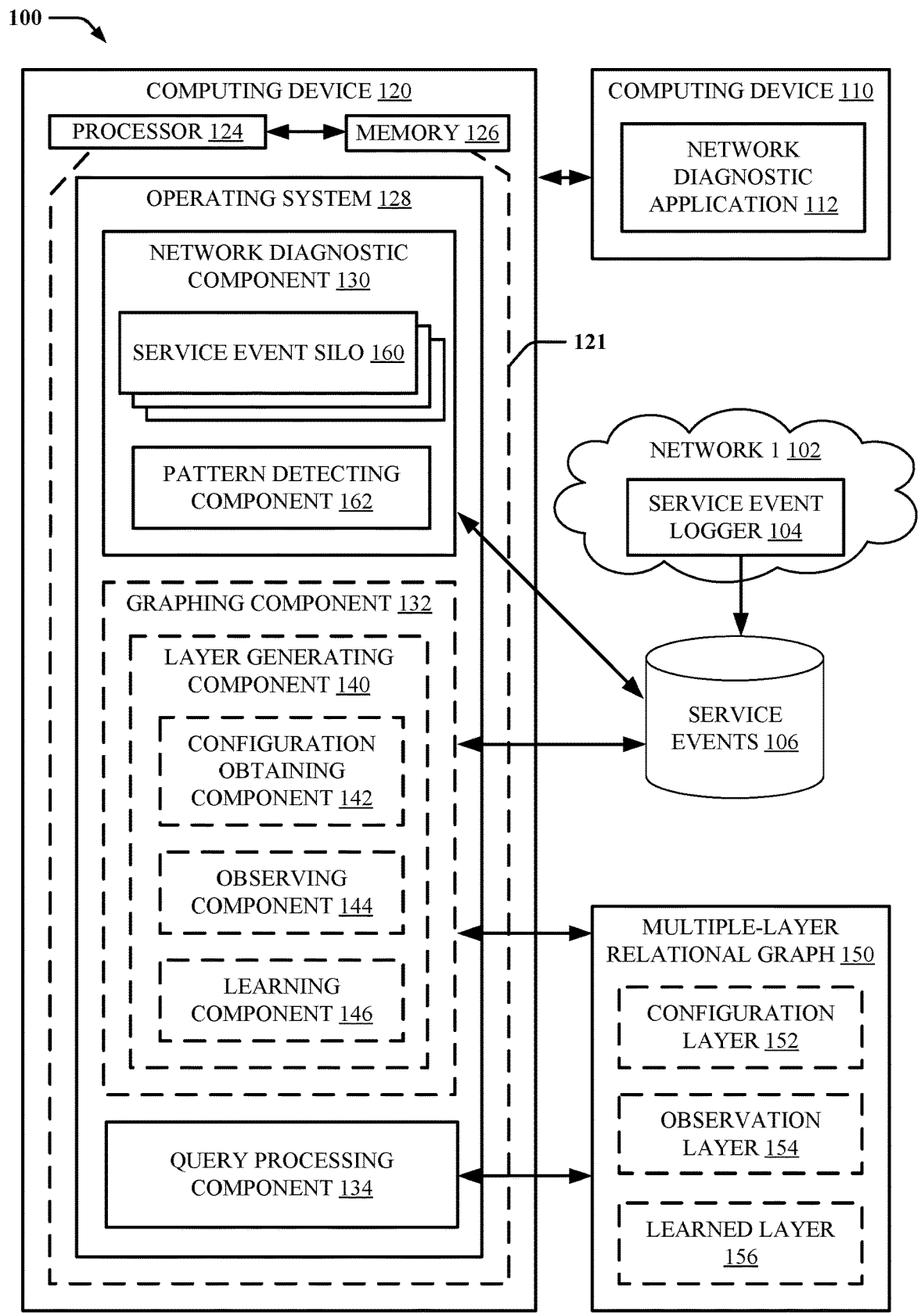
FIG. 1 is a schematic diagram of an example of a computing device for determining relationships among service events in accordance with examples described herein.
Figure 2:
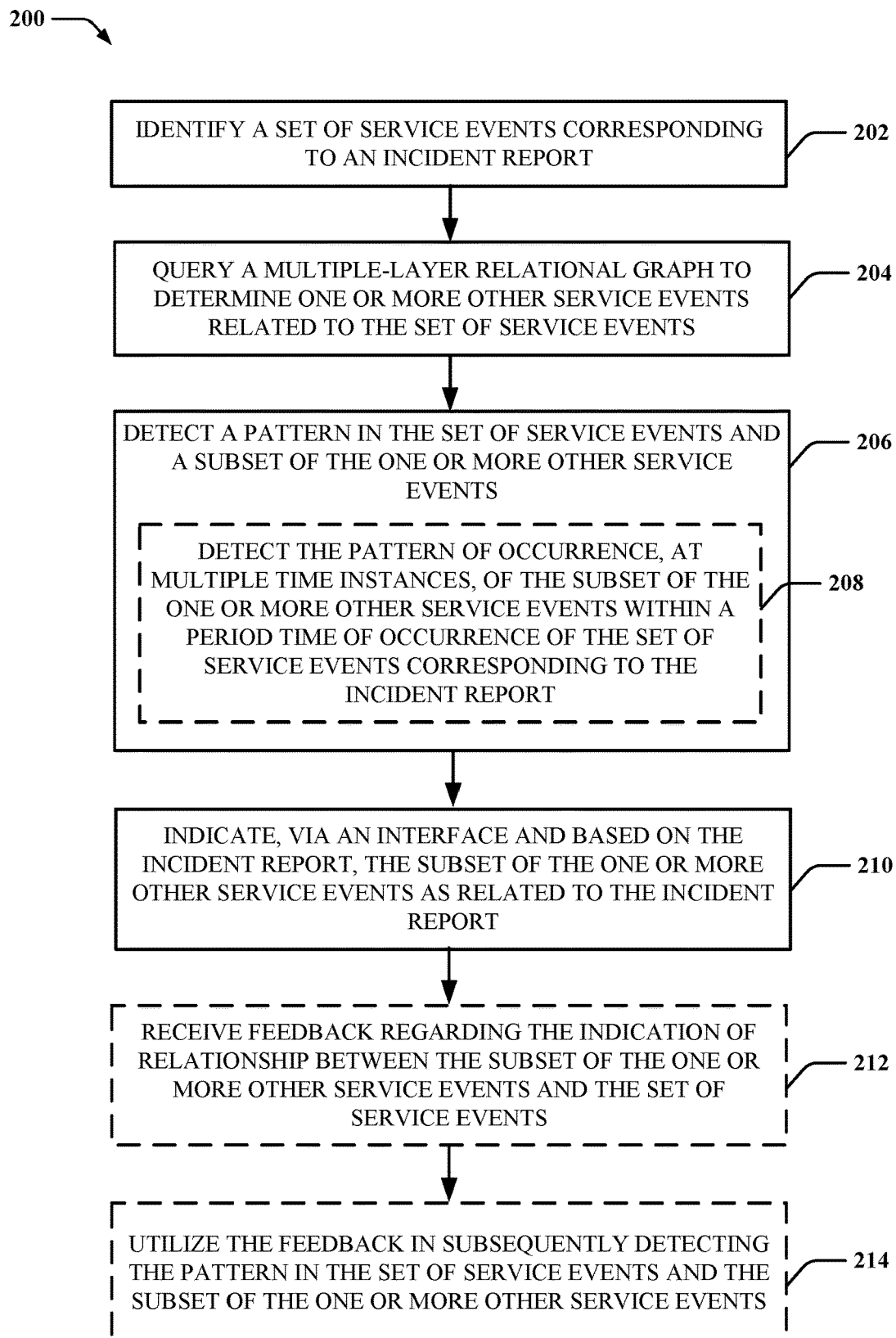
FIG. 2 is a flow diagram of an example of indicating service events of other services having a relationship to an incident report in accordance with examples described herein.
Figure 3:
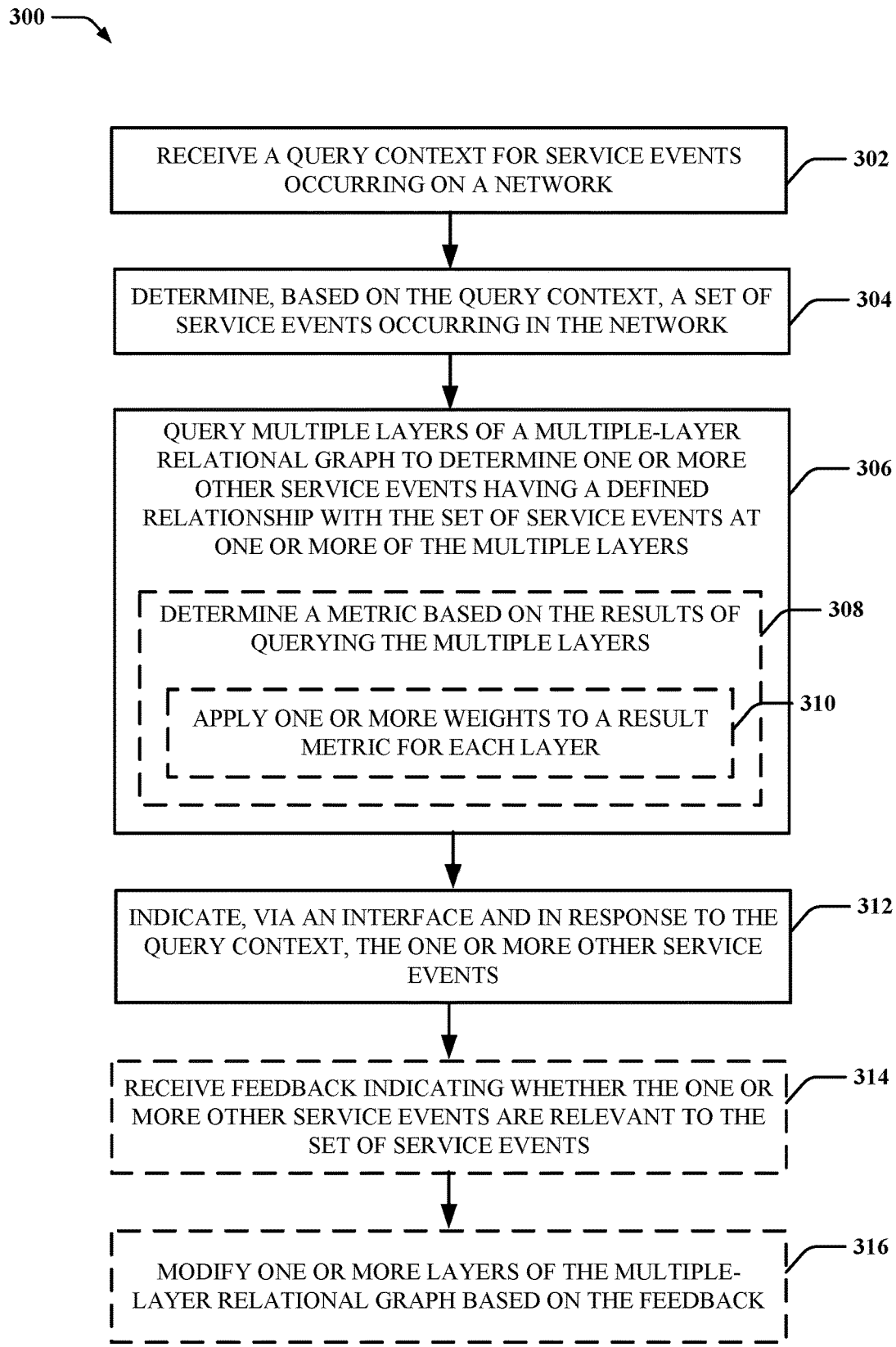
FIG. 3 is a flow diagram of an example of determining relationships among service events in accordance with examples described herein.
Figure 4:
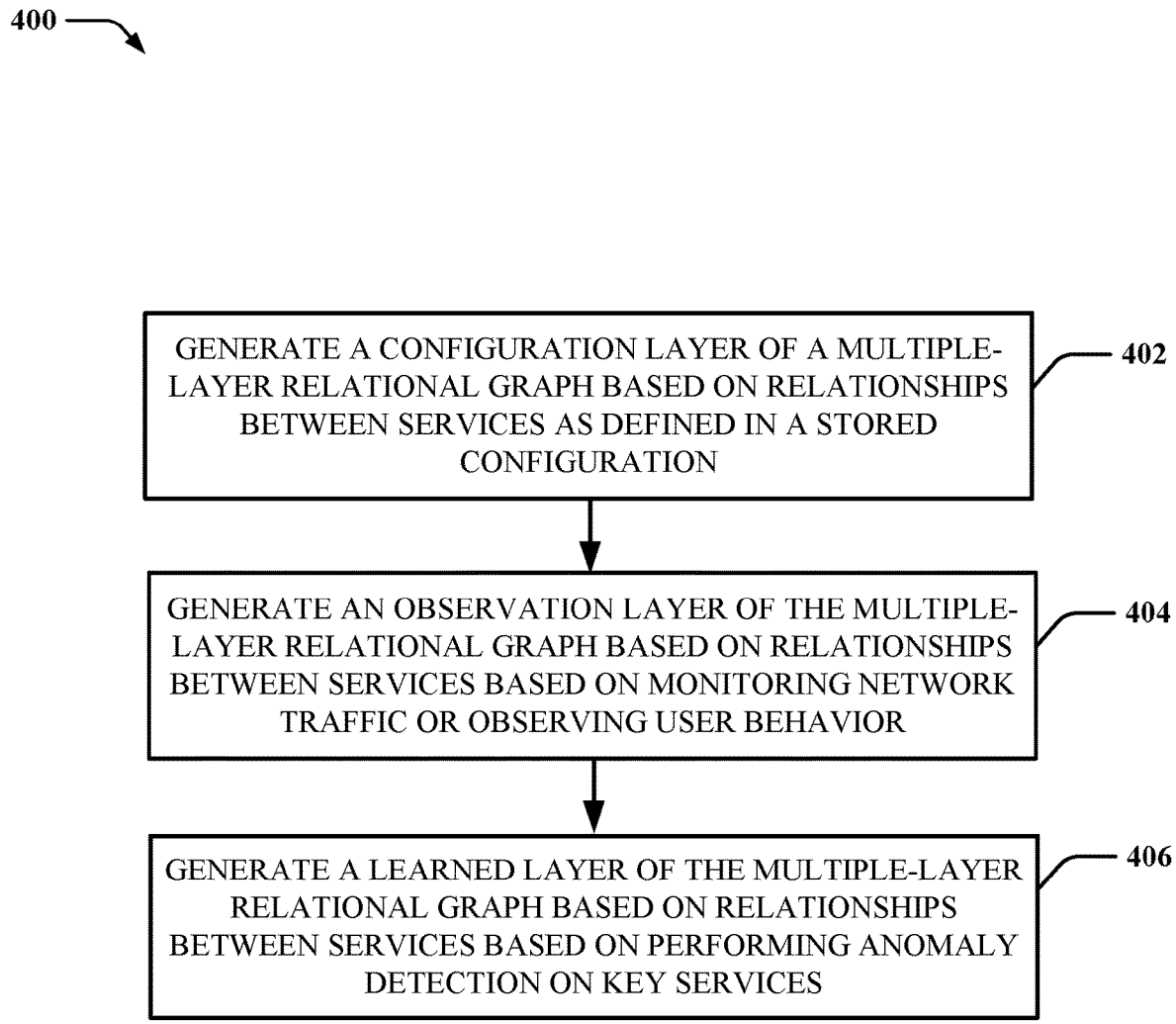
FIG. 4 is a flow diagram of an example of generating a multiple-level relational graph of service events in accordance with examples described herein.

Turning now to FIGS. 1-8, examples are depicted with reference to one or more components and one or more methods that may perform the actions or operations described herein, where components and/or actions/operations in dashed line may be optional. Although the operations described below in FIGS. 2-4 are presented in a particular order and/or as being performed by an example component, the ordering of the actions and the components performing the actions may be varied, in some examples, depending on the implementation. Moreover, in some examples, one or more of the following actions, functions, and/or described components may be performed by a specially-programmed processor, a processor executing specially-programmed software or computer-readable media, or by any other combination of a hardware component and/or a software component capable of performing the described actions or functions.

FIG. 1 is a schematic diagram of an example of a wireless communication system 100 that includes one or more networks, such as network 1 102, having one or more service event loggers 104 for logging service events occurring on resources of the network 1 102. For example, the resources of the network 1 102 may include various types of nodes, such as computing devices, databases, devices with a network-specific functionality, such as routers, bridges, firewalls, web servers, load balancers, etc., and/or the like. Each resource may have an associated service event logger 104 to log service events in a service event repository 106, where the service event logger 104 may operate on the resource or otherwise to detect communications from the resource for logging the service events. In an example, the service events in service event repository 106 may include various types of events to notify of a health or status of one or more resources, such as processor or memory utilization on the resource, throughput of traffic on the resource, application-specific events that are definable by applications executing on the resource, etc. The service events may also include or be referred to as incident reports to identify certain incidents occurring on resources. In one example, an incident report can include an incident derived from multiple service events detected with one or more defined parameter values (e.g., a poor or non-existent connection for a network resource based on detecting one or more consecutive service events related to a dropped connection).

A computing device 110 can be provided that can execute a network diagnostic application 112 to obtain service events from the service event repository 106 for inspection thereof and/or taking remedial steps to resolve an identified incident. As described, this can result in a vast number of service events being generated and stored in the service event repository 106 over a short period of time, and as such monitoring each service event can become overwhelming and ineffective for diagnosing possible issues in the network.

For example, another computing device 120 is provided for exposing a framework to obtain service event information from service event repository 106 and for generating additional structures to assist in processing the vast number of service events in the service event repository in accordance with aspects described herein. For example, computing device 120 can include or can otherwise be coupled with a processor 124 and/or memory 126, where the processor 124 and/or memory 126 can be configured to execute or store instructions or other parameters related to processing service events, generating a multiple-layer relational graph defining relationships among the service events, responding to queries for service events, etc., as described herein. For example, processor 124 and memory 126 may be separate components communicatively coupled by a bus (e.g., on a motherboard or other portion of a computing device, on an integrated circuit, such as a system on a chip (SoC), etc.), components integrated within one another (e.g., processor 124 can include the memory 126 as an on-board component 121), and/or the like. Memory 126 may store instructions, parameters, data structures, etc., for use/execution by processor 124 to perform functions described herein.

In an example, computing device 120 can execute an operating system 128 (e.g., via processor 124 and/or memory 126) for providing an environment for executing one or more components or applications. For example, operating system 128 may execute a network diagnostic component 130 for fulfilling requests for service event data from the service event repository 106, as requested by network diagnostic application(s) 112 on one or more other computing devices 110. In an example, network diagnostic component 130 can separate service events in the service event repository 106 into service event silos 160, where each service event silo 160 can correspond to a set of network resources, a set of services running on one or more network resources, etc. For example, a given service event silo 160 may correspond to a specific user account, a specific instance of a network diagnostic application 112 assigned to monitor the set of network resources, set of services, etc. of the service event silo 160. Though shown as created in network diagnostic component 130 (e.g., based on an underlying network resource or silo for which the service event is generated), in other examples, the network resources and/or services can be configured to store service events in the different silos. Moreover, a silo can include a separate physical repository, a virtual repository that can virtualize data from multiple local or remotely-located physical repositories to appear as a single silo, etc.

Operating system 128 may also execute a query processing component 134 for processing a query context for a service event based on determining one or more related service events from a multiple-layer relational graph 150, and/or may optionally include a graphing component 132 for generating the multiple-layer relational graph 150 defining multiple layers of relationships between service events in the service event repository 106. In an example, for a given incident report or underlying service event(s) in one service event silo 160, query processing component 134 can query the multiple-layer relational graph 150 to determine service events in other service event silos 160 that may be related to the given incident report or underlying service event(s) for reporting along with information regarding the given incident report or underlying service event(s). Network diagnostic component 130 can also include a pattern detecting component 162 to detect a pattern in results returned from the query of multiple-layer relational graph 150 to further distill the set of results for indicating the service events and/or related incident reports to the network diagnostic application 112.

In an example, optional graphing component 132 may optionally include a layer generating component 140 for generating the multiple layers of the multiple-layer relational graph 150. For example, layer generating component 140 can include an optional configuration obtaining component 142 for obtaining a configuration (e.g., as stored in memory 126 or other memory or from another device related to the network, another device for configuring network diagnostic analysis, etc.) where the configuration can specify relationships between service events or corresponding services and generating an optional configuration layer 152 of the multiple-layer relational graph 150 to indicate relationships based on the obtained configuration. In another example, layer generating component 140 can include an optional observing component 144 for observing network traffic, user behavior of the network diagnostic application 112, etc. with respect to the service events and/or corresponding services, and generating an optional observation layer 154 of the multiple-layer relational graph 150 to indicate relationships based on the observations. In another example, layer generating component 140 can include an optional learning component 146 for performing anomaly detection of key services or service events in the service event repository 106, and generating an optional learned layer 156 of the multiple-layer relational graph 150 to indicate relationships based on the detected anomalies in the service events.

As described, for example, query processing component 134 can process query contexts for service events received by or from the network diagnostic component 130 to provide additional service events that may be of interest based on a set of service events or services in the query context. For example, query processing component 134 can query the multiple-layer relational graph 150 via graphing component 132 or other component(s) that can access the graph 150, to determine the one or more additional service events based on relationships specified in the multiple-layer relational graph 150. The relationships can be identified at each of (or one or more of) the different layers 152, 154, 156. Query processing component 134 can determine whether to include the additional service events based on which layer(s) indicate the relationship and/or different associated metrics, such as an observation count in the observation layer 154, a confidence metric of the relationship in the learned layer 156, performing pattern mining, correlation, and/or other machine learning processes on results from the layers 152, 154, 156, etc.

Computing device 110 can also similarly include a processor 124, memory 126, operating system 128, etc., for operating the network diagnostic application 112 and/or other features or functions described herein. These components are not shown in the computing device 110 in FIG. 1 for ease of explanation.

FIG. 2 is a flowchart of an example of a method 200 for determining, for an incident report, related service events of other services for providing with information regarding the incident report. For example, method 200 can be performed by the computing device 120, and is accordingly described with reference to FIG. 1, as a non-limiting example of an environment for carrying out method 200.

In method 200, at action 202, a set of service events corresponding to an incident report can be identified. In an example, network diagnostic component 130, e.g., in conjunction with processor 124, memory 126, operating system 128, etc., can identify the set of service events corresponding to the incident report. For example, network diagnostic component 130 can receive an indication or request for the incident report and/or related information via a network diagnostic application 112. In one example, network diagnostic component 130 can alert the network diagnostic application 112 of the incident via one or more reporting criteria, and network diagnostic application 112 can request the information about the incident based at least in part on the reporting. For example, a user interacting with the network diagnostic application 112 on the computing device 110 can cause the network diagnostic application 112 to request the additional information regarding the incident for presenting on an interface of the network diagnostic application 112.

In any case, based on identifying the incident report, network diagnostic component 130 can identify one or more service events related to the incident report. For example, this can include identifying the one or more service events as causing triggering of the incident report or otherwise identified as related to the incident specified in the report. In one example, the network diagnostic component 130 can have generated the incident report based on detecting service events that achieve a criteria or threshold (e.g., processor utilization events for a network resource reporting utilization over a threshold for a period of time). In this example, network diagnostic component 130 can identify the set of service events as those used in generating the incident report. For example, the one or more service events may include one or more error codes causing the incident, resource usage information leading up to the incident, resource usage achieving a threshold utilization, etc. In the latter example, resource usage information can be periodically reported as service events, and thus determining resource usage levels in this regard can include detecting the resource usage in the reporting service events as achieving the threshold utilization for at least a period of time (e.g., over a number of successive service events, etc.).

In method 200, at action 204, a multiple-layer relational graph can be queried to determine one or more other service events related to the set of service events. In an example, query processing component 134, e.g., in conjunction with processor 124, memory 126, operating system 128, etc., can query the multiple-layer relational graph (e.g., multiple-layer relational graph 150) to determine the one or more other service events related to the set of service events. As described further herein, this can include querying each of the multiple layers to determine a relationship between the set of service events and the other service events at one or more of a given layer, a threshold number of layers, all layers, etc. In addition, for example, the determination at each layer may be based on a metric, a weighted metric, etc., and a determination of whether the one or more other service events are related to the set of service events may be based on the metric or weighted metric for one or more of the given layer, existence of a relationship between the other service events and the set of service events at a given layer, and/or the like.

Moreover, as described further herein, the multiple layers can include a configuration layer 152, observation layer 154, and/or learned layer 156 to provide various levels of possible relationships among service events. Using the various layers can provide a more intuitive list of service events that are possibly related to (e.g., related to a root cause of) the set of service events for the incident report. Furthermore, querying the multiple-layer relational graph 150 can allow for collecting information of service events across service event silos 160 for dependent services, to which a user of the network diagnostic component 160 may not have access or may not know about. In an example, the results of querying the multiple-layer relational graph 150 may include a large number of results that can be further distilled to determine a set of results most closely related to the service events of the incident report.

Thus, in method 200, at action 206, a pattern can be detected in the set of service events and a subset of the one or more other service events. In an example, pattern detecting component 162, e.g., in conjunction with processor 124, memory 126, operating system 128, network diagnostic component 130, etc., can detect the pattern in the set of service events and the subset of the one or more other service events. In this regard, the multiple-layer relational graph 150 can be used to decrease the number of other service events to use in pattern detection, which may reduce processing burden of performing pattern detection. For example, pattern detecting component 162 can execute a pattern detection or correlation algorithm or other machine-learning process, which may be keyed on the set of service events corresponding to the incident report and may evaluate the one or more other service events to detect the pattern(s). For example, pattern detecting component 162 can detect temporally correlated patterns in the service events, such as the subset of the one or more other service events occurring at a similar time as a service event that is the subject of the incident report.

In this regard, detecting the pattern at action 206 may optionally include, at action 208, detecting the pattern of occurrence, at multiple time instances, of the subset of the one or more other service events within a period of time of occurrence of the set of service events corresponding to the incident report. In an example, pattern detecting component 162, e.g., in conjunction with processor 124, memory 126, operating system 128, network diagnostic component 130, etc., can detect the pattern of occurrence, at multiple time instances, of the subset of the one or more other service events within a period of time of occurrence of the set of service events corresponding to the incident report. For example, pattern detecting component 162 can detect, over multiple time instances as indicated by the query processing component 134, the set of service events occurring within a threshold amount of time of the subset of the one or more other service events. In this example, the set of service events and the one or more other service events may be said to be historically correlated. In another example, the pattern may be based on additional or alternative parameters to temporal correlation, such as a type of service event, a service or network on which the service event occurs, feedback regarding previous indications of correlations, as described further herein, etc. Moreover, as described, the set of service events and the other service events may be in different service event silos 160, and thus may not otherwise be determined as associated with one another.

In method 200, at action 210, the subset of the one or more other service events can be indicated, via an interface and based on the incident report, as related to the incident report. In an example, network diagnostic component 130, e.g., in conjunction with processor 124, memory 126, operating system 128, etc., can indicate, via the interface and based on the incident report, the subset of the one or more other service events as related to the incident report. For example, network diagnostic component 130 can cause the network diagnostic application 112 to provide or display information on an interface that indicates the incident report, and/or the set of related service events, and can also indicate the subset of the one or more other service events determined as potentially relevant to the incident report. In one example, network diagnostic component 130 may determine another incident report that corresponds to the subset of the one or more other service events (e.g., as provided to another network diagnostic application 112 or otherwise inferred based on the collection of the subset of the one or more other service events), and can provide information regarding this other incident report to the network diagnostic application 112 for displaying as another incident report related to the original incident report. In another example, network diagnostic application 112 can list each of the subset of the one or more other service events on the interface, etc. or other information to allow the user to discern other service events, which may be from other service event silos 160, that are potentially relevant to the incident report. As described, this can allow for more focused root cause determination of an issue, can save from expending personnel resources of multiple teams to explore an incident having the same underlying root cause, etc.

In method 200, optionally at action 212, feedback regarding the indication of the relationship between the subset of the one or more other service events and the set of service events can be received. In an example, network diagnostic component 130, e.g., in conjunction with processor 124, memory 126, operating system 128, etc., can receive the feedback regarding the indication of the relationship between the subset of the one or more other service events and the set of service events. For example, network diagnostic application 112 can display another interface to request feedback (e.g., evaluation) regarding the accuracy of the relationship, and may communicate this feedback to network diagnostic component 130.

In method 200, optionally at action 214, the feedback can be utilized in subsequently detecting the pattern in the set of service events and the subset of the one or more other service events. In an example, network diagnostic component 130, e.g., in conjunction with processor 124, memory 126, operating system 128, etc., can utilize the feedback in subsequently detecting the pattern in the set of service events and the subset of the one or more other service events. For example, network diagnostic component 130 can use the feedback to validate or invalidate patterns detected in the query results, such that patterns that are previously indicated as not valid (e.g., with negative feedback) or similar patterns of the same or a different set of services may not be included in the subset of other service events provided back to the network diagnostic application 112.

FIG. 3 is a flowchart of an example of a method 300 for determining related service events in processing a query for a set of one or more service events. For example, method 300 can be performed by the computing device 120, and is accordingly described with reference to FIG. 1, as a non-limiting example of an environment for carrying out method 300.

In method 300, at action 302, a query context for service events occurring on a network can be received. In an example, query processing component 134, e.g., in conjunction with processor 124, memory 126, operating system 128, etc., can receive the query context for service events occurring on the network. For example, query processing component 134 can receive the query context from network diagnostic component 130, where the network diagnostic component 130 can receive a corresponding query from a network diagnostic application 112 executing on another computing device 110. For example, network diagnostic component 130 can facilitate querying of service events in service event repository 106, as described, and can provide various network diagnostic applications 112 with service event information (e.g., incident reports, etc.) based on a request from a network diagnostic application 112, based on a subscription from the network diagnostic application 112 to receive certain service events (e.g., for certain resources and/or for certain types of service events, etc.), and/or the like.

Figure 5:
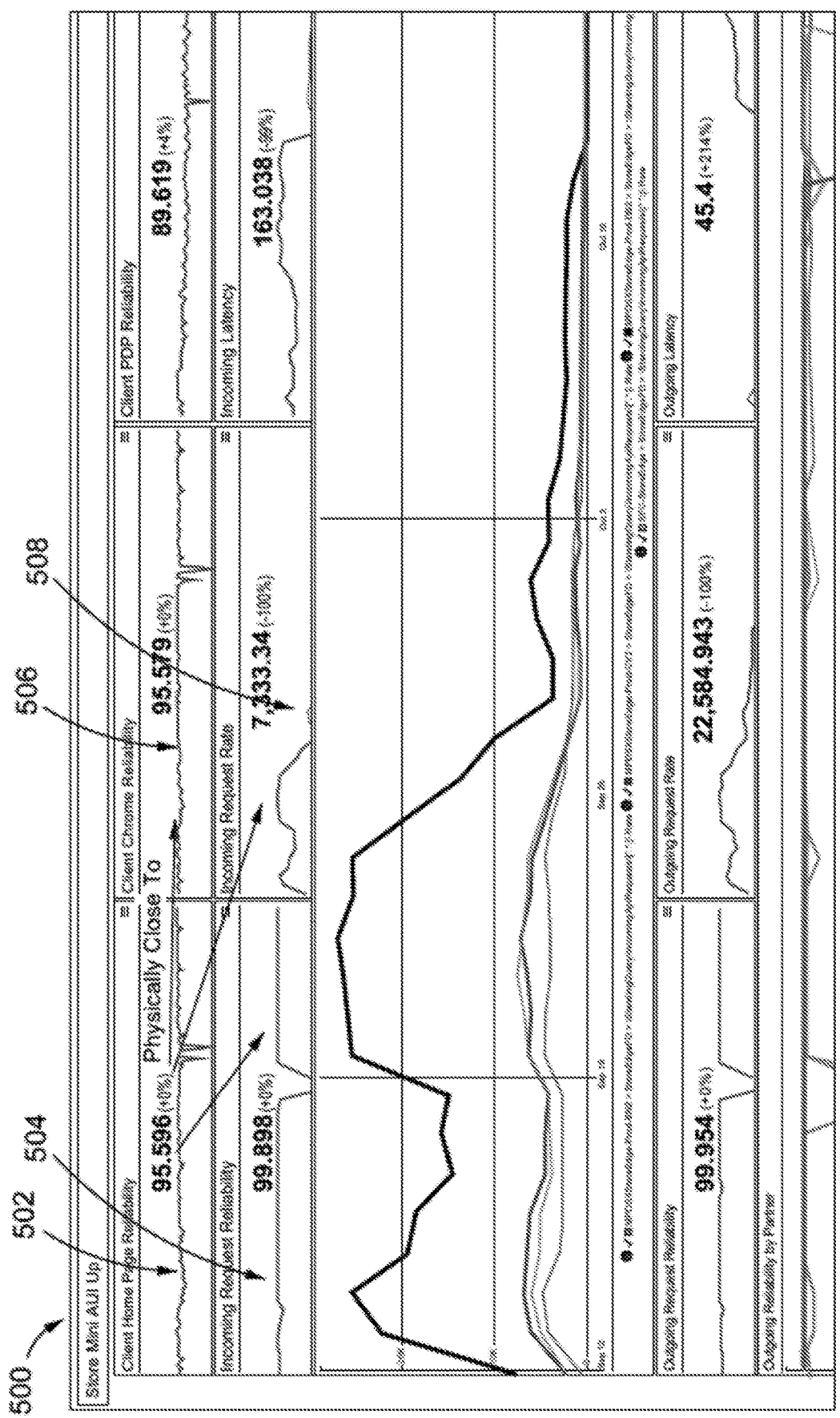
FIG. 5 is a diagram of an example of a user interface of a network diagnostic application in accordance with examples described herein.
Figure 6:
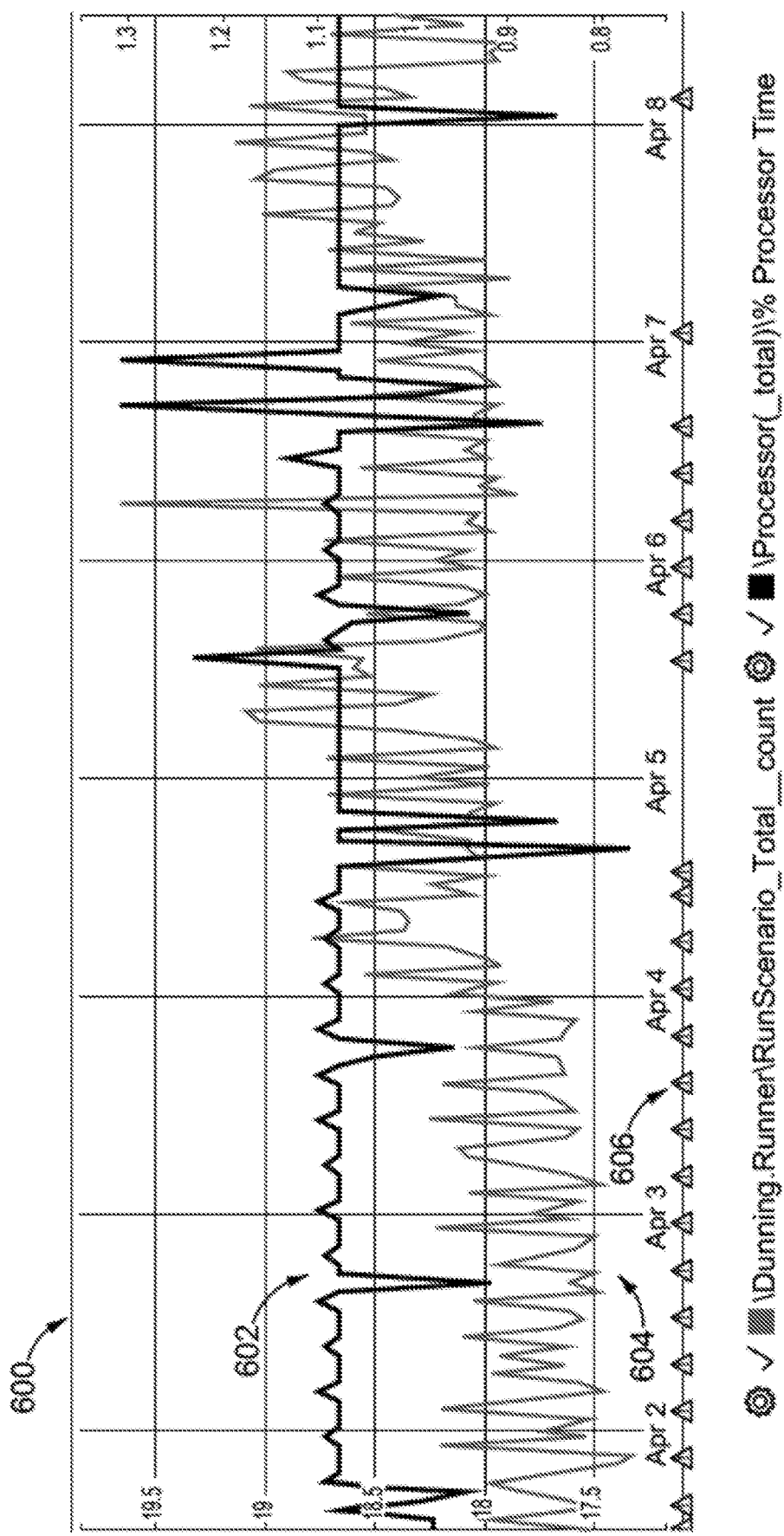
FIG. 6 is a graphical representation of an example of signals corresponding to underling service events in accordance with examples described herein.

In one specific example, a query context can relate to a signal that can represent service events, such as a signal line representing processor utilization at a network resource. In this example, network diagnostic application 112 may request service events related to the processor utilization at the network resource, which may include periodic service events received from the network resource (e.g., via a service event logger 104) that report the processor utilization. Network diagnostic application 112 can utilize the service events to generate a signal on a user interface representing the processor utilization reported in the service events. Examples are shown in FIGS. 5 and 6, which are described in further detail below.

In one example, network diagnostic component 130 can also implement security policies that define security contexts for users to access certain service events for certain nodes, certain types of service events, etc. In this example, network diagnostic component 130 can ensure a network diagnostic application 112 has the security clearance (e.g., a user of the application 112 is in a certain security group) to receive the requested service event information. In any case, network diagnostic component 130 can provide requested service event information to the corresponding network diagnostic application 112.

In method 300, at action 304, a set of service events occurring in the network can be determined based on the query context. In an example, network diagnostic component 130 and/or query processing component 134, e.g., in conjunction with processor 124, memory 126, operating system 128, etc., can determine, based on the query context, the set of (e.g., one or more) service events occurring in the network. For example, the request can be a request/response request, a subscription request, etc., that can indicate one or more parameters in the query context. The one or more parameters may identify a type of service event, a service, a corresponding network resource, and/or the like. In one example, the query content may indicate a user account for the network diagnostic application 112, a network resource or machine being viewed, and/or a view (or related parameters) of service events for the network resource. Given this information, for example, network diagnostic component 130 can obtain data (e.g., including a collection of one or more service events) from service event repository 106 for providing to the corresponding network diagnostic application 112.

For example, network diagnostic component 130 can query the service event repository 106 to obtain the service events as requested (e.g., as related to a certain service and/or network resource). In another example, network diagnostic component 130 can receive (e.g., based on a subscription) service events from the service event repository 106 that correspond to the certain service and/or network resource (e.g., where the service event repository can callback a callback function of the network diagnostic component 130 based on receiving the service events and associating the service events with a subscription, etc.).

In addition, e.g., based on the query context, network diagnostic component 130 can additionally query a multiple-layer relational graph 150 for additional service events that may be related to the query context or the set of service events specified in the query context. For example, network diagnostic component 130 can query the multiple-layer relational graph 150 based on determining underlying service events of an incident to be reported, as described above in method 200. Query processing component 134 can obtain the query and can determine the set of service events occurring in the network based on the query context (e.g., similarly as network diagnostic component 130 and/or can receive this information directly from network diagnostic component 130). Given the set of one or more service events in the query context, additional services possibly of interest can be identified from the multiple-layer relational graph, as described herein.

In one example, a query context can relate to a view of the network diagnostic application 112 that may be associated with multiple service events over a period of time, such as a signal showing resource usage over a period of time, where the resource usage is indicated over time in various service events. In this example, network diagnostic component 130 can query the service event repository to determine the service events indicating the resource usage for the service over the period of time, and network diagnostic application 112 can graphically represent the usage as a signal line over time. Network diagnostic application 112 can be used to generate multiple views in this regard, where each view can have an underlying query context for obtaining corresponding service events used to create the views. Thus, as an example of correlating service events based on observation, where views are generated for viewing together, a relationship between the underlying queries may be observed as occurring at similar times, for similar users, on similar network diagnostic application 112 or computing device 110, etc., as described further herein.

In method 300, at action 306, multiple-layers of a multiple-layer relational graph can be queried to determine one or more other service events having a defined relationship with the set of service events at one or more of the multiple layers. In an example, query processing component 134 (e.g., via a request from network diagnostic component 130 or otherwise), e.g., in conjunction with processor 124, memory 126, operating system 128, etc., can query the multiple layers of the multiple-layer relational graph 150 to determine the one or more other service events having a defined relationship with the set of service events at one or more of the multiple layers. For example, query processing component 134 can query the configuration layer 152, the observation layer 154, and/or the learned layer 156 of the multiple-layer relational graph 150 to determine a relationship between the set of services and the one or more other services at least at one or more of the layers 152, 154, 156. The related service events may be determined as related based on a relation between the underlying services, which can be determined from one or more of the layers 152, 154, 156, and/or other considerations, such as based on a timing of the service events (e.g., service events occurring within a threshold time of one another) of the related services, and/or the like. Though shown as part of the same computing device 120, in an example, query processing component 134 can be at a different computing device than graphing component 132 that generates, manages, and/or stores the multiple-layer relational graph 150.

For example, given a service event in the set of one or more service events, query processing component 134 may identify a relationship with one or more other service events in the configuration layer 152, the observation layer 154, and/or the learned layer 156. As described, the configuration layer 152 can indicate (e.g., and/or may store an indication of) a relationship between the service event and one or more other service events as specified in a configuration. For example, the configuration may be generated using a user interface to allow a user to indicate known relationships between service events and/or corresponding services.

The observation layer 154 can indicate (e.g., and/or may store an indication of) a relationship between the service event and one or more other service events that is based on observing network traffic of requests for the service event (or for a similar type of service event, for other events for the corresponding service, etc.) and similar network traffic (e.g., occurring at a similar time, from a similar computing device 110 or user account, etc.) of the one or more other service events.

The observation layer 154 can additionally or alternatively indicate (e.g., and/or may store an indication of) a relationship between the service event and one or more other service events that is based on observing user activity (e.g., of the network diagnostic application 112) in requesting and/or viewing the service event (or similar types of service events, other events for the corresponding service, etc.) and then also requesting and/or viewing the one or more other service events. For each observed relationship, the observation layer 154 may include one or more metrics, in one example, such as an observation count for the number of times the observed relationship criteria is detected. For example, the observations can be made in real-time or near real-time as traffic or user activity occurs, or can be made after-the-fact based on analyzing network traffic logs, logs of user activity on network diagnostic component 130, etc.

The learned layer 156 can indicate (e.g., and/or may store an indication of) a relationship between the service event and one or more other service events that is based on algorithmic determinations regarding the service events within the service event repository 106, such as by detecting data anomalies corresponding to the other service events based on keying the service event. For each anomaly, the learned layer 156 may include one or more metrics, in one example, such as a confidence metric for the determined relationship.

In querying the multiple layers at action 306, optionally at action 308, a metric based on the results of querying the multiple layers can be determined. In an example, query processing component 134, e.g., in conjunction with processor 124, memory 126, operating system 128, etc., can determine the metric based on the results of querying the multiple layers. For example, query processing component 134 can determine the metric based on whether a relationship is determined from a given layer and/or based on the layers within which the relationship exists. For example, query processing component 134 can determine a first metric where the relationship is determined from the configuration layer 152. In one example, this can be a highest metric and/or can definitively identify a relationship between the service in the set of one or more services and the other services, as the relationship can be explicitly identified by a user. In addition, for example, the metric can be determined based on one or more other metrics observed or obtained from each layer, such as an observation count in the observation layer for an observed relationship between the service events (and/or types of service events), confidence score in the learned layer, etc., as described.

Moreover, in determining the metric at action 308, optionally at action 310, one or more weights can be applied to a result metric for each layer. In an example, query processing component 134, e.g., in conjunction with processor 124, memory 126, operating system 128, etc., can apply the one or more weights to the result metric for each layer (or one or more of the layers). For example, query processing component 134 can apply higher weights to metrics for the configuration layer 152, as described, and/or can determine any desirable weighting for each layer. In one example, weighting the metrics for the layers 152, 154, 156 may be based on feedback of whether correlations between service events is accurate (e.g., based on being presented via an interface). In any case, the weights and/or metrics can be compared with threshold(s) to determine whether to indicate a correlation between a determined set of service events and the other service events discovered from the multiple-layer relational graph.

In addition, in an example, query processing component 134 can further perform pattern mining or other machine-learning algorithms based on a more limited set of correlated services and/or service events determined from the multiple-layer relational graph 150. In this example, query processing component 134 can further distill a list of services and/or service events determined as possibly related from the multiple layers 152, 154, 156 of the graph 150 by performing pattern mining on the list of services and/or service events.

In method 300, at action 312, the one or more other service events can be indicated via an interface and in response to the query context. In an example, query processing component 134 and/or network diagnostic component 130, e.g., in conjunction with processor 124, memory 126, operating system 128, etc., can indicate, via the interface (e.g., user interface) and in response to the query context, the one or more other service events. For example, query processing component 134 can indicate the one or more other service events to the network diagnostic component 130 for providing to the corresponding network service application 112 requesting the query. In an example, query processing component 134 can determine whether to indicate the one or more other service events based on the determined metric and/or can indicate any other service events for which a relationship is identified (or determined to have an associated metric that achieves a threshold) in one of the multiple layers of the multiple-layer relational graph 150, in a threshold number of the multiple layers of the multiple-layer relational graph 150, in each of the multiple layers of the multiple-layer relational graph 150, etc.

Additionally, for example, query processing component 134 and/or network diagnostic component 130 may indicate the one or more other service events including an indication of a relationship to the set of service events determined for the query context. The indication of relationship may include an identifier for the other service event(s) indicating the relationship and/or a level of relationship (e.g., a metric, weight, and/or the like, as described).

For example, network service application 112 can provide an indication of the one or more other service events received from the query processing component 134 or network diagnostic component 130 using various mechanisms. For example, network service application 112 can provide the indication as another view or signal line representing the one or more other service events presented along with a view that may correlate to the query context. In another example, network service application 112 can provide the indication as a list of the other service events, an indication of the other service events occurring at times corresponding to the set of service events that correlate to the query context, etc. In yet another example, network service application 112 can provide the indication as a pop-up or other notification that there are possibly related service events (e.g., the other service events) to the service events that are the subject of the query context. Moreover, as described, the network service application 112 may also provide a mechanism for indicating feedback for the indication of the other service events (e.g., feedback as to whether the other service events are relevant to the service events that are the subject of the query context).

In method 300, optionally at action 314, feedback indicating whether the one or more other service events are relevant to the set of service events can be received. In an example, query processing component 134 and/or network diagnostic component 130, e.g., in conjunction with processor 124, memory 126, operating system 128, etc., can receive the feedback indicating whether the one or more other service events are relevant to the set of service events. For example, as described, network service application 112 can provide an interface for prompting for feedback of the relevancy, and can provide any indicated feedback to the query processing component 134 and/or network diagnostic component 130. For example, the feedback can indicate whether the one or more other service events are relevant to the set of service events that are the subject of the query context, a level of relevancy, and/or the like.

In method 300, optionally at action 316, one or more layers of the multiple-layer relational graph can be modified based on the feedback. In an example, graphing component 132, e.g., in conjunction with processor 124, memory 126, operating system 128, etc., can modify one or more layers of the multiple-layer relational graph 150 (e.g., the configuration layer 152, the observation layer 154, or other layers) based on the feedback. For example, graphing component 132 may modify metrics associated with observations at the observation layer 154 based on the feedback (e.g., improve a metric where the feedback is positive, decrease the metric or delete an observation association where the feedback is negative, etc.).

FIG. 4 is a flowchart of an example of a method 400 for generating a multiple-layer relational graph indicating relationships between service events and/or corresponding services. For example, method 400 can be performed by the computing device 120, and is accordingly described with reference to FIG. 1, as a non-limiting example of an environment for carrying out method 400. In addition, method 400 can be performed in preparation for fulfilling queries and/or determining related service events, as described in methods 200 and 300. In another example, method 400 can be performed as a real-time or near real-time process as part of querying the multiple-layer relational graph at action 204 of method 200 and/or action 306 of method 300.

In method 400, at action 402, a configuration layer of a multiple-layer relational graph can be generated based on relationships between services as defined in a stored configuration. In an example, layer generating component 140, e.g., in conjunction with processor 124, memory 126, operating system 128, graphing component 132, etc., can generate the configuration layer of the multiple-layer relational graph based on relationships between services as defined in the stored configuration. For example, configuration obtaining component 142 can obtain the stored configuration (e.g., from memory 126 and/or from another computing device, etc.), which can be generated based on user input received via an interface for defining relationships between service events and/or between corresponding services. As described, services may depend on one another, and this dependency can be indicated in the stored configuration. This can allow for determining a relationship between service events occurring on the dependent services (e.g., at a similar time or otherwise).

In one example, the configuration can define a relationship between service events based on collating and linking of underlying incident records by on-call engineers with incident management and service observability systems. For example, a user of network diagnostic application(s) 112 executing on various computing devices 110 can indicate the linking of the incident records and/or service events via an interface option on the network diagnostic application 112. In other examples, other applications can be used to indicate the configured associations between service events, service event types, services, incident reports, incident report types, etc. The configuration layer 152 may include an indication of a relationship (or link) between at least a subject service and the one or more other services, such that the query processing component 134 can identify the link and report the other services or service events of the other services (e.g., occurring at a similar time or otherwise indicated as depending on the subject service event) as possibly of interest.

In method 400, at action 404, an observation layer of the multiple-layer relational graph can be generated based on relationships between services based on monitoring network traffic or observing user behavior. In an example, layer generating component 140, e.g., in conjunction with processor 124, memory 126, operating system 128, graphing component 132, etc., can generate the observation layer of the multiple-layer relational graph based on relationships between services based on monitoring network traffic or other topological relationships or observing user behavior.

For example, observing component 144 can monitor the network traffic (e.g., coming from network diagnostic application(s) 112 or network diagnostic component 130) to determine correlated requests for services or service events. For example, where observing component 144 observes similar patterns in requests for services and/or service events at different times based on the network traffic, whether from the same network diagnostic application(s) 112 or different network diagnostic application(s), or other topological relationships between signal sources (e.g., the source being the service from which the service event is logged), observing component 144 may infer an observed relationship between the services and/or service events.

Similarly, where observing component 144 observes similar patterns in requests for services and/or service events at different times based on user behavior on the network diagnostic application 112 (e.g., as observed from the network diagnostic application 112 itself or requests received at the network diagnostic component 130), observing component 144 may infer an observed relationship between the services and/or service events. In one example, observing component 144 can observe user behavior of the diagnostic application 112 itself, which in one specific example may include a configuration of a user-defined interface of the network diagnostic application 112. For example, a user may define a user interface to analyze health or other metrics of network resources, where the interface may display signals generated based on observed service events (e.g., service events reporting resource utilization). In one specific example, based on physical proximity of signals on the interface (e.g., as being next to one another, part of the same chart/graph, etc.), observing component 144 can determine a relationship between the corresponding services. The information regarding the user-defined interface layout may be provided to the network diagnostic component 130, from which the observation layer 154 can receive such information.

An example is shown in FIG. 5, which illustrates an example of a user interface 500 of a network diagnostic application 112. In user interface 500, a user thereof may have defined the user interface 500 to include signals 502, 504, 506, 508 in the view. The signals 502, 504, 506, 508 may each correspond to a set of service events for different services that the user desires to monitor. The signals 502, 504, 506, 508 may show information of the service events (e.g., reliability, incoming request rate or reliability, etc.) over the same or similar period of time and/or at the same or similar time instances. In this example, observing component 144 can determine that the user interface 500 includes the signals 502, 504, 506, 508 on the same view and/or within a threshold physical proximity within the view, that the user interface 500 processes interactions on the signals 502, 504, 506, 508 at similar points in time, etc., and can accordingly observe a relationship between the corresponding service events and/or underlying services, which can be set in the observation layer 154 for subsequently determining related services or service events. As described, for example, observing component 144 can observe such properties of the user interface 500 based on at least one of determining the user interface 500 defined on the network diagnostic component 130 that facilitates operation of the network diagnostic application 112, receiving, at the network diagnostic component 130, an alert of creation/modification of the user interface 500 on the network diagnostic application 112, and/or the like.

In any case, the observation layer 154 may include an indication of a relationship (or link) between at least a subject service and the one or more other services, such that the query processing component 134 can identify the link and report the other services or service events of the other services (e.g., occurring at a similar time or otherwise indicated as depending on the subject service event) as possibly of interest.

In one example, observing component 144 may include an observation count, frequency, etc. based on a number of observations of the services and/or service events within a period of time, where the observation count may indicate a likelihood of correlation between the services and/or service events. Thus, for a given service or service event, query processing component 134 can determine related services or service events based on the observations, observation count, etc., to provide in response to a query for the given service. For example, these observations can indicate what services and/or service events on-call engineers are looking at when looking at the given service or service event, as described.

In method 400, at action 406, a learned layer of the multiple-layer relational graph can be generated based on relationships between services based on performing anomaly detection on key services. In an example, layer generating component 140, e.g., in conjunction with processor 124, memory 126, operating system 128, graphing component 132, etc., can generate the learned layer of the multiple-layer relational graph based on relationships between services based on performing anomaly detection on key services (e.g., a subject service where generating the learned layer 156 is performed in real-time or near real-time or otherwise). For example, learning component 146 can perform correlations, anomaly detection, or other machine-learning algorithms (e.g., pattern mining) on the services and/or service events in the service event repository 106 to identify likely related services and/or service events.

The learned layer 156 may include an indication of a relationship (or link) between at least a subject service and the one or more other services, such that the query processing component 134 can identify the link and report the other services or service events of the other services (e.g., occurring at a similar time or otherwise indicated as depending on the subject service event) as possibly of interest. For example, the learned layer 156 can detect anomalies in certain service event data over a period of time, such as resource utilization of services or related network nodes based on reported service events. For example, anomalies can be detected in similar changes in utilization amounts, the times at which utilization changes (e.g., regardless of whether the amount is similar), etc.

In one example, learning component 146 may determine a confidence score or other metric for identified anomalies between services and/or service events, which can be included in the learned layer 156. Thus, for a given service or service event, query processing component 134 can determine related services or service events based on the detected anomalies, the confidence score or other metric, etc., to provide in response to a query for the given service. In one example, the confidence score may be based on a number of correlations observed between the potentially related services or service events.

An example is shown in FIG. 6, which illustrates an example of a graphical depiction of signals 600 related to service events, where signal 602 relates to a set of service events of a service, such as resource utilization, etc., as described, and signal 604 relates to a different set of service events that may be determined as related to the set of service events of signal 602 based on correlation or other machine-learning algorithms. For example, correlation may show events happening at similar time instances, indicated by symbols 606. In an example, learning component 146 may determine a relationship between the underlying service events based on detecting a threshold number of events happening in each signal within a period of time (and/or a confidence score may be computed based on the frequency of correlated events among the signals or underlying service events). In an example, learning component 146 can set a determined relationship and/or related metrics in the learned layer 156 for subsequently determining related services or service events.

In the multiple-layer relational graph 150, relational data from the various layers 152, 154, 156 can be combined, as described, and used to build a knowledge graph between the services and their metrics. Traversal of this graph 150 can be useful in various applications, such as root cause analysis, determining most failing metrics, grouping of related metric failures etc.

Figure 7:
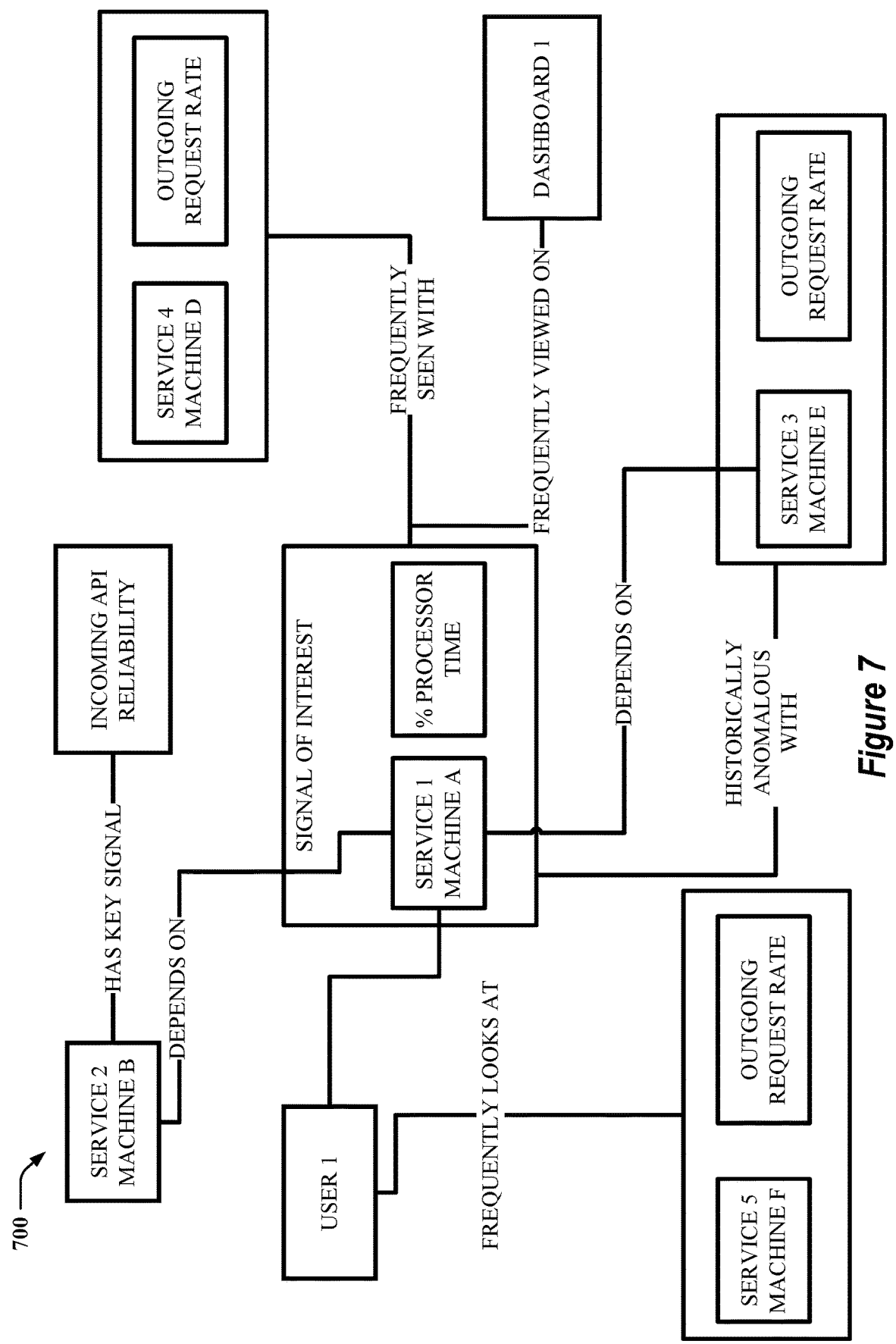
FIG. 7 is an example of a relational graph representation of a service and related service events in accordance with examples described herein.

FIG. 7 illustrates an example of a relational graph representation 700 of a set of service events. For example, representation 700 can indicate a signal of interest, which can refer to a metric (e.g., processor usage) measured on a specific network resource based on a collection of service events (e.g., events that indicate resource usage at periods of time). For example, the signal of interest can be requested and/or defined by a network diagnostic application 112 on a computing device 110 to receive, from the service event repository 107 in real-time, near real-time or otherwise, processor usage service events for the network resource via network diagnostic component 130. In an example, a query context can include an indication of the user, the service or associated network resource, and a view of the network diagnostic application 112 being requested (which can indicate the desired service events). In determining relationships with other service events, query processing component 134 can query the configuration layer 152 to determine that service 1 on machine A depends on service 2 on machine B, and/or specifically that the processor usage on service 1 on machine A depends on incoming API reliability on service 2 on machine B. Thus, query processing component 134 can provide, in response to a query for processor usage of service 1 on machine A, corresponding API reliability service events for service 2 on machine B.

Similarly, query processing component 134 can query the observation layer 154 to determine service events typically viewed by this user (or other users) along with the service event that is subject of the view to determine additional service events of interest (and/or related views of the additional service events, such as other signals). For example, query processing component 134 can determine a relationship (e.g., frequency looked at) indicated on observation layer 154 between the user looking at service 5 on machine F when also looking at service 1 on machine A. As described, this observation may be determined based on a user-defined interface that includes views of metrics for service 5 on machine F and service 1 on machine A (and specifically for outgoing request rate for service 5 on machine F with the processor usage time for service 1 on machine A). Thus, query processing component 134 can provide, in response to a query for processor usage of service 1 on machine A, corresponding outgoing request rate events for service 5 on machine F.

In another example, query processing component 134 can determine a relationship (e.g., frequency seen with) indicated on observation layer 154 between network traffic for obtaining metrics related to service 4 at machine D around the same time or times as network traffic for obtaining metrics related to service 1 on machine A (and specifically for outgoing request rate for service 4 on machine D with the processor usage time for service 1 on machine A). Thus, query processing component 134 can provide, in response to a query for processor usage of service 1 on machine A, corresponding outgoing request rate events for service 4 on machine D.

Similarly, query processing component 134 can query the learned layer 156 to determine service events that are historically anomalous with the service event that is subject of the view to determine additional service events of interest (and/or related views of the additional service events, such as other signals). For example, query processing component 134 can determine a relationship indicated on learned layer 156 between service 3 on machine E (and specifically outgoing request rate) and at service 1 on machine A. Thus, query processing component 134 can provide, in response to a query for processor usage of service 1 on machine A, corresponding outgoing request rate events for service 3 on machine E.

In any case, for example, the network diagnostic application 112 can indicate potential relationship between the various service events based on the correlations that are detected/observed at each or one or more (or all) layers in the multiple-layer relational graph.

Figure 8:
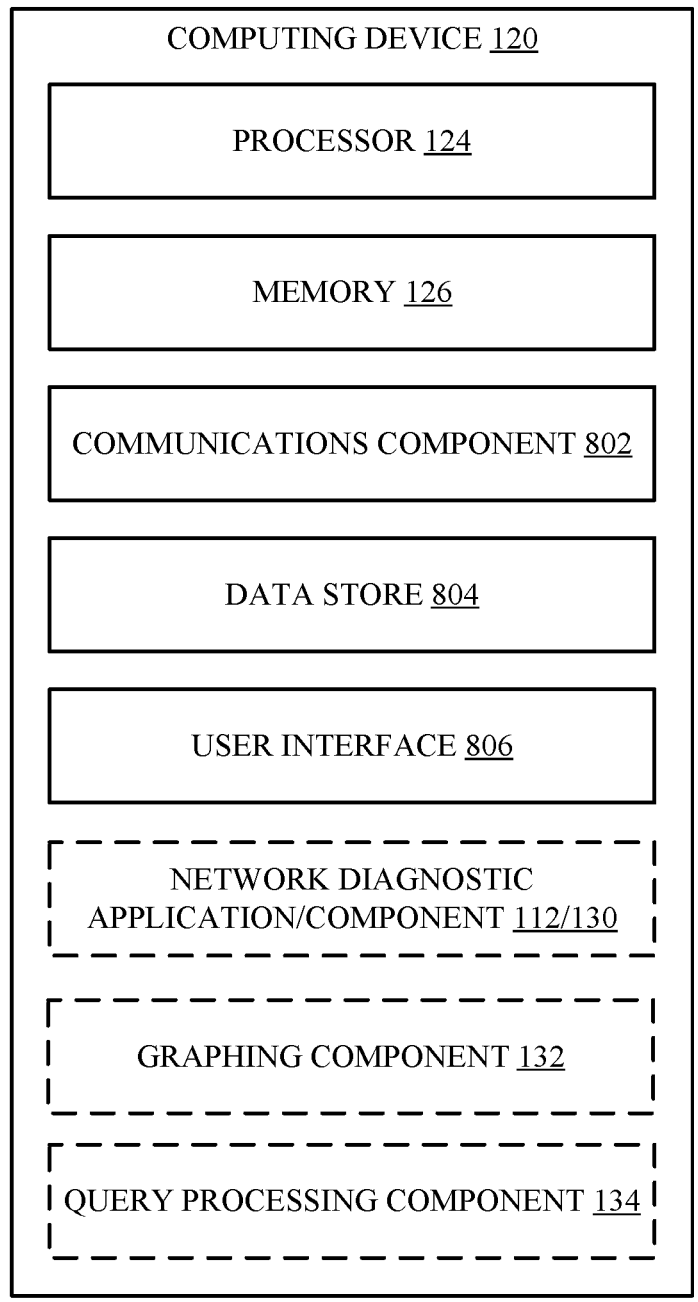
FIG. 8 is a schematic diagram of an example of a computing device for performing functions described herein.

FIG. 8 illustrates an example of computing device 120 including additional optional component details as those shown in FIG. 1. In one example, computing device 120 may include processor 124 for carrying out processing functions associated with one or more of components and functions described herein. Processor 124 can include a single or multiple set of processors or multi-core processors. Moreover, processor 124 can be implemented as an integrated processing system and/or a distributed processing system.

Computing device 120 may further include memory 126, such as for storing local versions of applications being executed by processor 124, related instructions, parameters, etc. Memory 126 can include a type of memory usable by a computer, such as random access memory (RAM), read only memory (ROM), tapes, magnetic discs, optical discs, volatile memory, non-volatile memory, and any combination thereof. Additionally, processor 124 and memory 126 may include and execute an operating system executing on processor 124, one or more applications, such as a network diagnostic application/component 112/130, graphing component 132, query processing component 134, and/or components thereof, as described herein, and/or other components of the computing device 120.

Further, computing device 120 may include a communications component 802 that provides for establishing and maintaining communications with one or more other devices, parties, entities, etc. utilizing hardware, software, and services as described herein. Communications component 802 may carry communications between components on computing device 120, as well as between computing device 120 and external devices, such as devices located across a communications network and/or devices serially or locally connected to computing device 120. For example, communications component 802 may include one or more buses, and may further include transmit chain components and receive chain components associated with a wireless or wired transmitter and receiver, respectively, operable for interfacing with external devices. For example, communications component 802 can carry communications between a network diagnostic application/component 112/130, graphing component 132, query processing component 134, etc. executing on another device (or the same device), etc., as described in various examples herein.

Additionally, computing device 120 may include a data store 804, which can be any suitable combination of hardware and/or software, that provides for mass storage of information, databases, and programs employed in connection with examples described herein. For example, data store 804 may be or may include a data repository for applications and/or related parameters not currently being executed by processor 124, may include the service event repository 106, etc. In addition, data store 804 may be a data repository for an operating system, application, such as a network diagnostic application/component 112/130, graphing component 132, query processing component 134, and/or components thereof, etc. executing on the processor 124, and/or one or more other components of the computing device 120.

Computing device 120 may also include a user interface component 806 operable to receive inputs from a user of computing device 120 and further operable to generate outputs for presentation to the user (e.g., via a display interface to a display device). User interface component 806 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, any other mechanism capable of receiving an input from a user, or any combination thereof. Further, user interface component 806 may include one or more output devices, including but not limited to a display interface, a speaker, a haptic feedback mechanism, a printer, any other mechanism capable of presenting an output to a user, or any combination thereof.

Computing device 120 can also include a network diagnostic application/component 112/130 for generating a query context related to one or more service events, a graphing component 132 for generating a multiple-layer relational graph defining relationships between service events, and/or a query processing component 134 for processing queries for service events by providing one or more other service events based on relationships defined in the multiple-layer relational graph, as described herein.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more examples, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various examples described herein. Various modifications to these examples will be readily apparent to those skilled in the art, and the generic principles defined herein may be applied to other examples. Thus, the claims are not intended to be limited to the examples shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various examples described herein that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What claimed is:

1. A computer-implemented method for detecting related service events in a network diagnostic application, comprising:

identifying a set of service events corresponding to an incident report;

querying each of multiple layers of a multiple-layer relational graph to determine one or more other service events related to the set of service events, wherein the multiple layers of the multiple-layer relational graph include a configuration layer defining configured relationships between services or service events, an observation layer defining observed relationships between services or service events, and a learned layer defining algorithmically-determined relationships between services or service events;

detecting a pattern in the set of service events and a subset of the one or more other service events; and indicating, via a user interface and based on the incident report, the subset of the one or more other service events as related to the incident report.

2. The computer-implemented method of claim 1, wherein detecting the pattern comprises detecting the pattern of occurrence, at multiple time instances, of the subset of the one or more other service events within a period of time of occurrence of the set of service events corresponding to the incident report.

3. The computer-implemented method of claim 1, wherein the set of service events corresponds to a first data silo, and the one or more other service events correspond to one or more other data silos.

4. The computer-implemented method of claim 1, further comprising:
receiving, via the user interface, feedback regarding an indication of relationship between the subset of the one or more other service events and the set of service events; and
utilizing the feedback in subsequently detecting the pattern in the set of service events and the subset of the one or more other service events.

5. The computer-implemented method of claim 1, further comprising generating the configuration layer based on user input received that defines relationships between services.

6. The computer-implemented method of claim 1, further comprising generating the observation layer based on relationships between services determined based on monitoring network traffic to detect services communicating with one another.

7. The computer-implemented method of claim 1, further comprising generating the observation layer based on relationships between services determined based on monitoring user behavior to detect services observed in diagnosing another service.

8. The computer-implemented method of claim 1, further comprising generating the learned layer based on relationships between services determined based on performing anomaly detection on key services.

9. A computing device for detecting related service events in a network diagnostic application, comprising:
a memory storing one or more parameters or instructions for identifying related service events from a service event repository; and
at least one processor coupled to the memory, wherein the at least one processor is configured to:
identify a set of service events corresponding to an incident report;
query each of multiple layers of a multiple-layer relational graph to determine one or more other service events related to the set of service events, wherein the multiple layers of the multiple-layer relational graph include a configuration layer defining configured relationships between services or service events, an observation layer defining observed relationships between services or service events, and a learned layer defining algorithmically-determined relationships between services or service events;
detect a pattern in the set of service events and a subset of the one or more other service events; and
indicate, via a user interface and based on the incident report, the subset of the one or more other service events as related to the incident report.

10. The computing device of claim 9, wherein the at least one processor is configured to detect the pattern at least in part by detecting the pattern of occurrence, at multiple time instances, of the subset of the one or more other service events within a period of time of occurrence of the set of service events corresponding to the incident report.

11. The computing device of claim 9, wherein the set of service events corresponds to a first data silo, and the one or more other service events correspond to one or more other data silos.

12. The computing device of claim 9, wherein the at least one processor is further configured to:
receive, via the user interface, feedback regarding an indication of relationship between the subset of the one or more other service events and the set of service events; and
utilize the feedback in subsequently detecting the pattern in the set of service events and the subset of the one or more other service events.

13. The computing device of claim 9, wherein the at least one processor is further configured to generate the configuration layer based on user input received that defines relationships between services.

14. The computing device of claim 9, wherein the at least one processor is further configured to generate the observation layer based on relationships between services determined based on monitoring network traffic to detect services communicating with one another.

15. The computing device of claim 9, wherein the at least one processor is further configured to generate the observation layer based on relationships between services determined based on monitoring user behavior to detect services observed in diagnosing another service.

16. The computing device of claim 9, wherein the at least one processor is further configured to generate the learned layer based on relationships between services determined based on performing anomaly detection on key services.

17. A non-transitory computer-readable medium, comprising code executable by one or more processors for detecting related service events in a network diagnostic application, the code comprising code for:
identifying a set of service events corresponding to an incident report;
querying each of multiple layers of a multiple-layer relational graph to determine one or more other service events related to the set of service events, wherein the multiple layers of the multiple-layer relational graph include a configuration layer defining configured relationships between services or service events, an observation layer defining observed relationships between services or service events, and a learned layer defining algorithmically-determined relationships between services or service events;
detecting a pattern in the set of service events and a subset of the one or more other service events; and
indicating, via a user interface and based on the incident report, the subset of the one or more other service events as related to the incident report.

18. The non-transitory computer-readable medium of claim 17, wherein the code for detecting detects the pattern of occurrence, at multiple time instances, of the subset of the one or more other service events within a period of time of occurrence of the set of service events corresponding to the incident report.

19. The non-transitory computer-readable medium of claim 17, wherein the set of service events corresponds to a first data silo, and the one or more other service events correspond to one or more other data silos.

20. The non-transitory computer-readable medium of claim 17, further comprising code for generating the configuration layer based on user input received that defines relationships between services.

* * * * *